US012542037B2

United States Patent
Lei et al.

(10) Patent No.: US 12,542,037 B2
(45) Date of Patent: Feb. 3, 2026

(54) LINE-ALIGNMENT INDICATOR CIRCUIT AND NETWORK CABLING TOOL FOR SIMULTANEOUS LINE ALIGNMENT AND LINE FINDING BY SHARING RJ45 CONNECTOR PORT

(71) Applicant: Yongzhou Noyafa Electronic Co., Ltd., Hunan (CN)

(72) Inventors: Ming Lei, Hunan (CN); Jianping Zhang, Hunan (CN)

(73) Assignee: Yongzhou Noyafa Electronic Co., Ltd., Yongzhou (CN)

( * ) Notice: Subject to any disclaimer, the term of this patent is extended or adjusted under 35 U.S.C. 154(b) by 13 days.

(21) Appl. No.: 18/673,351

(22) Filed: May 24, 2024

(65) Prior Publication Data
US 2025/0201088 A1    Jun. 19, 2025

(30) Foreign Application Priority Data
Dec. 19, 2023    (CN) .......................... 202323468254.X

(51) Int. Cl.
| G08B 5/36 | (2006.01) |
| H02J 7/00 | (2006.01) |
| H04Q 1/02 | (2006.01) |
| H03F 3/183 | (2006.01) |

(52) U.S. Cl.
CPC .............. *G08B 5/36* (2013.01); *H04Q 1/136* (2013.01); *H02J 7/0042* (2013.01); *H02J 2207/20* (2020.01); *H03F 3/183* (2013.01); *H03F 2200/03* (2013.01)

(58) Field of Classification Search
CPC .......... H04Q 1/136; G08B 5/36; H02J 7/0042; H02J 2207/20
See application file for complete search history.

(56) References Cited

U.S. PATENT DOCUMENTS

| 6,300,877 B1 * | 10/2001 | Schannach | H04Q 1/136 340/657 |
| 8,035,309 B2 * | 10/2011 | Hente | H05B 45/60 315/297 |
| 8,188,673 B2 * | 5/2012 | Hente | H05B 45/60 315/291 |

(Continued)

FOREIGN PATENT DOCUMENTS

WO    WO-2010125496 A1 *    11/2010    ............. H05B 47/17

*Primary Examiner* — John A Tweel, Jr.

(57) ABSTRACT

The line-alignment indicator circuit includes at least one set of LED indicators, each set of LED indicators comprising an LED lamp, a diode, a filter capacitor respectively, wherein the LED lamp and the diode are connected in reverse parallel, the filter capacitor is connected in parallel to the LED lamp, and a capacitance of the filter capacitor is 100 nf-10 μf. In the present disclosure, each line-alignment indicator is connected in parallel with a capacitor with a capacitance of 100 nf-10 μf. Due to the characteristic of the capacitor blocking DC but passing AC, it filters out the influence of IF line-finding signal, and does not form voltage difference on the line indicator causing disorderly flashing of the line indicator, so as to achieve the compatibility of the two functions of line finding and line alignment, and to eliminate the interference of the line-finding signal on the line-alignment indicator.

20 Claims, 9 Drawing Sheets

(56) References Cited

U.S. PATENT DOCUMENTS 9,007,206 B2* 4/2015 Chen ................ H04Q 1/136
438/49
9,345,087 B2* 5/2016 Yu .................... H05B 45/48

* cited by examiner

LINE-ALIGNMENT INDICATOR CIRCUIT AND NETWORK CABLING TOOL FOR SIMULTANEOUS LINE ALIGNMENT AND LINE FINDING BY SHARING RJ45 CONNECTOR PORT

CROSS REFERENCE TO RELATED APPLICATIONS

The present application claims the benefit of Chinese Patent Application No. 202323468254.X filed on Dec. 19, 2023, the contents of which are incorporated herein by reference in their entirety.

FIELD

Disclosed in the present disclosure is a network cabling tool, particularly a line-alignment indicator circuit and a network cabling tool for simultaneous line alignment and line finding by sharing a RJ45 connector port, which belongs to the technical field of electrician's tools.

BACKGROUND

Line finders and cable tester for line alignment are common network cabling tools in the prior art, and are mainly used for testing network lines, troubleshooting, and so on. At present, in the mainstream sales of network cabling tools on the market, it is common to use an RJ45 network port to detect the network line-alignment sequence. When detecting, an RJ45 network port is found in the network, or a common port for line-finding and alignment is tested for line-alignment sequence, or a line-finding test is performed. However, the line-alignment and line-finding test functions are achieved separately, and it is not possible to perform the line-alignment and line-finding test functions simultaneously, which renders the operation inefficient. As the result of the line-alignment sequence test is indicated by the LED running lamp, when the line-finding function and the line-alignment function are achieved simultaneously, the LED indication of the result of the line-alignment sequence test will be affected by the line-finding signal, resulting in chaotic blinking of the line-alignment LED indicator, which seriously affects the indication of the line-alignment result.

SUMMARY

In view of the aforementioned deficiencies of prior art network cabling tools that do not allow for simultaneous line-alignment and line-finding testing, provided in the present disclosure is a line-alignment indicator circuit and a network cabling tool for simultaneous line alignment and line finding by sharing RJ45 connector port. Each line-alignment indicator is connected in parallel with a capacitor with a capacitance of 100 nf-10 µf, so as to achieve the compatibility of the two functions of line finding and line alignment, and to eliminate the interference of the line-finding signal on the line-alignment indicator.

The technical solution adopted in the present disclosure to solve the technical problems is a line-alignment indicator circuit, including at least one set of LED indicators, each set of LED indicators comprising an LED lamp, a diode, and a filter capacitor respectively, in which the LED lamp and the diode are connected in reverse parallel, i.e., a positive pole of the LED lamp is connected to a negative pole of the diode, and a negative pole of the LED lamp is connected to a positive pole of the diode, the filter capacitor is connected in parallel to the LED lamp, and a capacitance of the filter capacitor is 100 nf-10 µf.

A network cabling tool for simultaneous line alignment and line finding by sharing RJ45 connector port, including a primary unit and a secondary unit operating in cooperation with each other. The primary unit includes a primary unit central control module, a line-finding signal amplifying-output module, a line-alignment indicator module mentioned above, a channel gating module, a power supply module, and a primary unit RJ-45 interface, the line-finding signal amplifying-output module is connected to the primary unit central control module, the primary unit RJ-45 interface is connected to the line-finding signal amplifying-output module, the line-alignment indicator module is connected to the primary unit RJ-45 interface, the channel gating module is connected to the line-alignment indicator module, and the power supply module is used to power the primary unit. The secondary unit includes a secondary unit central control module, a line-finding receiving module, a gain gating module, an operational amplifier module, a sensitivity adjusting module, a remote line-alignment module, and a secondary unit RJ-45 interface, the line-finding receiving module is connected to the gain gating module, an output end of the gain gating module is connected to an input end of the operational amplifier module, an output end of the operational amplifier module is connected to a data end of the secondary unit central control module, the sensitivity adjusting module is connected to the operational amplifier module, an input end of the sensitivity adjusting module is connected to the data end of the secondary unit central control module, and the remote line-alignment module is connected to the secondary unit RJ-45 interface.

The technical solution adopted in the present disclosure to solve the technical problems further includes: the LED lamp is connected in series with a current limiting resistor.

The circuit is provided with nine sets of LED indicators, and each set of LED indicators includes one LED lamp, one diode, and one filter capacitor.

The primary unit central control module is connected with a primary unit indicator lamp, a button module, and a battery voltage sampling module, the battery voltage sampling module including a resistor R5 and a resistor R7 connected in series; an end of the resistor R5 is connected to a positive electrode of a lithium battery, an opposite end of the resistor R5 is connected to an end of the resistor R7, an opposite end of the resistor R7 is grounded, and a common end of the resistor R5 and the resistor R7 is directly connected to an I/O port with ADC function of a microcontroller chip U1.

The channel gating module adopts a channel gating chip U6, each set of LED indicators is connected to one channel of the channel gating chip U6, a CLK port of the channel gating chip U6 is connected to a +5V power supply via a current limiting resistor R25, the CLK port of the channel gating chip U6 is connected with a triode Q1, a collector of the triode Q1 is connected to the CLK port of the channel gating chip U6, an emitter of the triode Q1 is grounded, a base of the triode Q1 is connected to a common I/O port of a microcontroller chip U1 via a current limiting resistor R22, a RES port of the channel gating chip U6 is connected to a +5V power supply via a current limiting resistor R26, the RES port of the channel gating chip U6 is connected with a triode Q2, a collector of the triode Q2 is connected to the RES port of the channel gating chip U6, an emitter of the triode Q2 is grounded, and a base of the triode Q2 is connected to a common I/O port of the microcontroller chip U1 via a current limiting resistor R23.

The line-finding signal amplifying-output module adopts a line driver U2, a Y4 port of the line driver U2 is connected to a cable of the primary unit RJ-45 port, an A1 port of the line driver U2 is connected to a +5V power supply, an A2 port of the line driver U2 is grounded, an A3 port of the line driver U2 is connected to the +5V power supply via a resistor R77, the A3 port of the line driver U2 is also connected to a collector of a triode Q5, an emitter of the triode Q5 is grounded, an A4 port of the line driver U2 is connected to a base of the triode Q5, the A4 port of the line driver U2 is also connected to a collector of a triode Q4, an emitter of the triode Q4 is grounded, and a base of the triode Q4 is connected to a common I/O port of a microcontroller chip U1. An OE1 port and an OE2 port of the line driver U2 are connected in parallel and connected to the +5V power supply via a resistor R1, an OE3 port and an OE4 port of the line driver U2 are connected in parallel and connected to the +5V power supply via a resistor R61, the OE3 port and the OE4 port of the line driver U2 are connected to a collector of a triode Q3 respectively, an emitter of the triode Q3 is grounded, a base of the triode Q3 is connected to a common I/O port of the microcontroller chip U1.

The power supply module includes a USB port, a lithium battery charging management chip U7, a lithium battery, a DC-DC boosting chip U9, and a voltage regulator chip U3, the USB port is connected to the lithium battery charging management chip U7, the lithium battery is connected to the lithium battery charging management chip U7, the DC-DC boosting chip U9 is connected to the lithium battery, and the voltage regulator chip U3 is connected to the DC-DC boosting chip U9.

The remote line-alignment module includes at least one set of remote line-alignment LED indicators, each set of remote line-alignment LED indicators comprising an LED lamp, a diode, and a filter capacitor respectively, wherein the LED lamp and the diode are connected in reverse parallel, i.e., a positive pole of the LED lamp is connected to a negative pole of the diode, and a negative pole of the LED lamp is connected to a positive pole of the diode, the filter capacitor is connected in parallel to the LED lamp, and a capacitance of the filter capacitor is 100 nf-10 µf.

The line-finding receiving module adopts a coil sensor, the coil sensor is connected between a gate and a source between an MOS tube Q6, the source of the MOS tube Q6 is grounded, a drain of the MOS tube Q6 is connected to a +9V power supply, the drain of the MOS tube Q6 is connected to an end of a ceramic filter Y1, and an opposite end of the ceramic filter Y1 is connected to the gain gating module, the gain gating module adopts a channel selector IC1, each input channel of the channel selector IC1 is connected with a gain resistor respectively, a resistance of each gain resistor is different from each other, the ceramic filter Y1 is connected to the input channels of the channel selector IC1 via each resistor, a signal selecting port of the channel selector IC1 is connected to a data end of the secondary unit central control module, the ceramic filter Y1 is connected to a reverse input end of an amplifier U1-A, an output end of the channel selector IC1 is connected to an output end of the amplifier U1-A, and a forward input end of the amplifier U1-A is connected with the sensitivity adjusting module. The sensitivity adjusting module adopts a controllable precision voltage regulator chip ZD1, the operational amplifier module adopts an amplifier U1-B, an output end of the gain gating module is connected to a reverse input end of the amplifier U1-B, a forward input end of the amplifier U1-B is connected to the sensitivity adjusting module, and an output end of the amplifier U1-B is connected to a data end of the secondary unit central control module. The secondary unit further includes an audio amplifying-output module, the audio amplifying-output module adopts an audio amplifier U11, an input end of the audio amplifying-output module is connected to the data end of the secondary unit central control module, and an output end of the audio amplifying-output module is connected with a speaker P1.

The beneficial effects of the present disclosure are as follows. In the present disclosure, each line-alignment indicator is connected in parallel with a capacitor with a capacitance of 100 nf-10 µf. Due to the characteristic of the capacitor blocking DC but passing AC, it filters out the influence of IF line-finding signal and does not form voltage difference on the line indicator causing disorderly flashing of the line indicator, so as to achieve the compatibility of the two functions of line finding and line alignment, and to eliminate the interference of the line-finding signal on the line indicator.

The present disclosure is further described below in conjunction with the attached drawings.

DETAILED DESCRIPTION OF THE EMBODIMENTS

The present embodiment is the preferred embodiment of the present disclosure, and any other principle and basic structure that is the same or similar to the present embodiment is within the scope of protection of the present disclosure.

Figure 1:
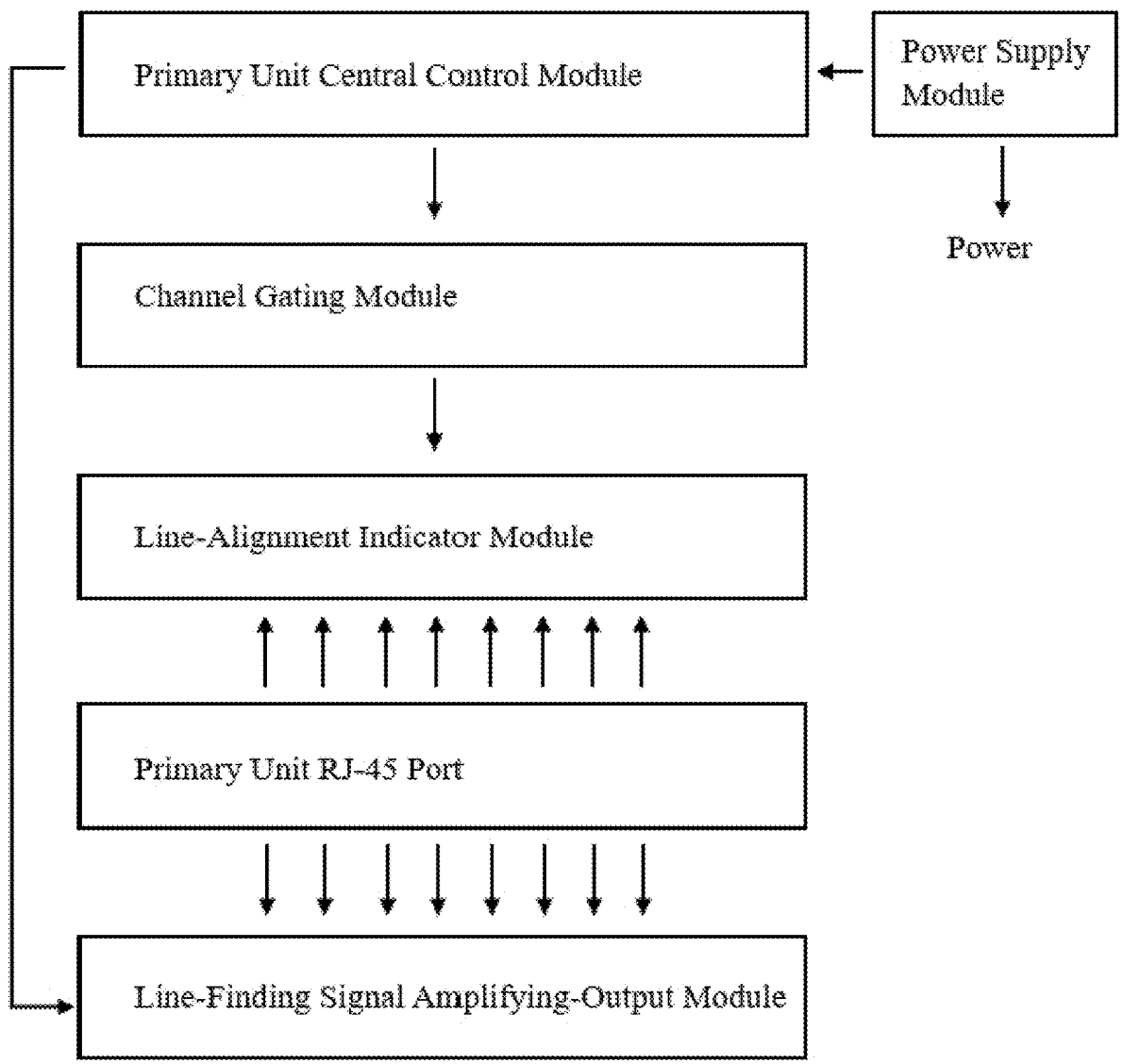
FIG. 1 is a block diagram of the circuit of the primary unit part of the present disclosure.
Figure 2:
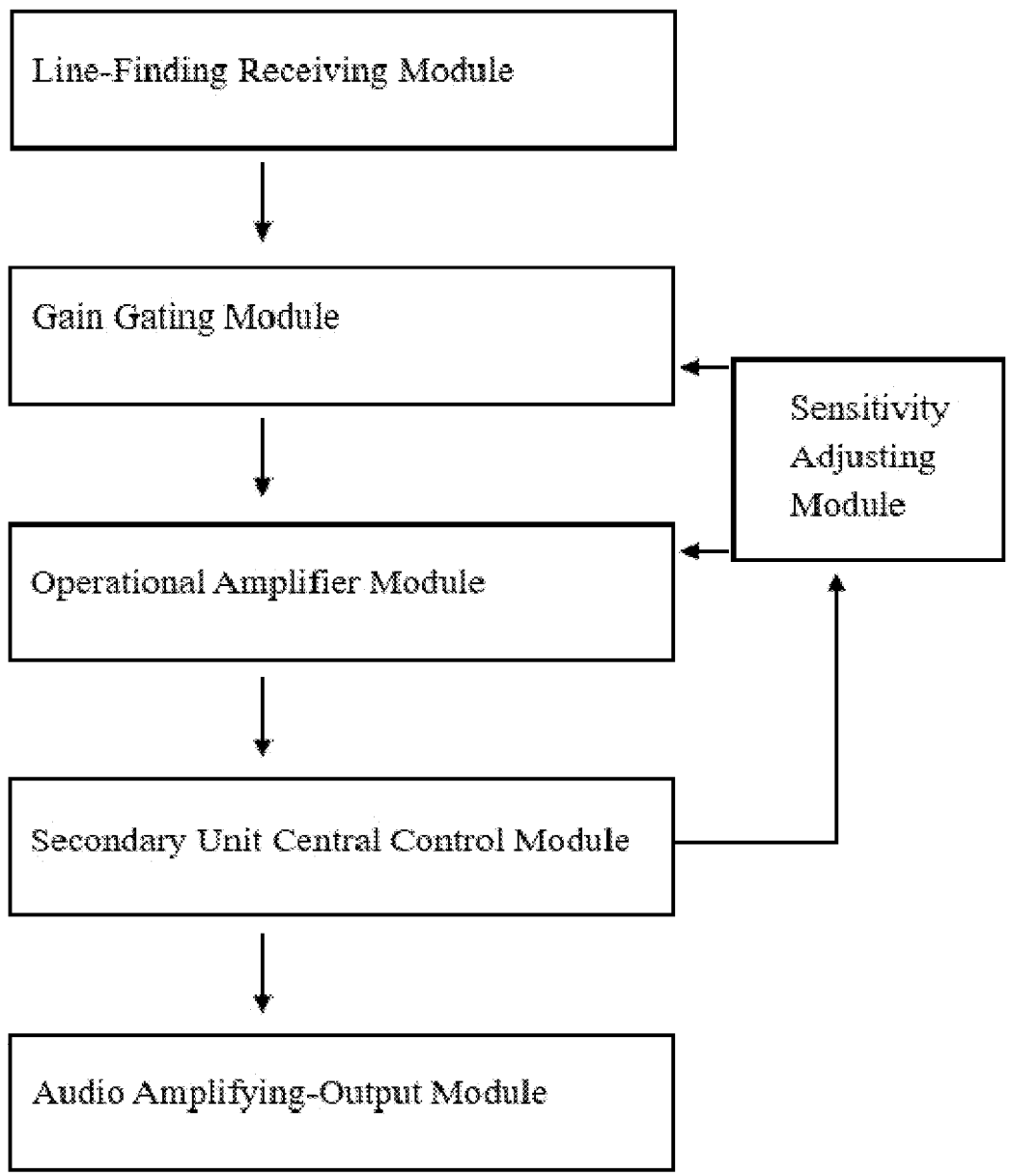
FIG. 2 is a block diagram of the circuit of the secondary unit part of the present disclosure.
Figure 3:
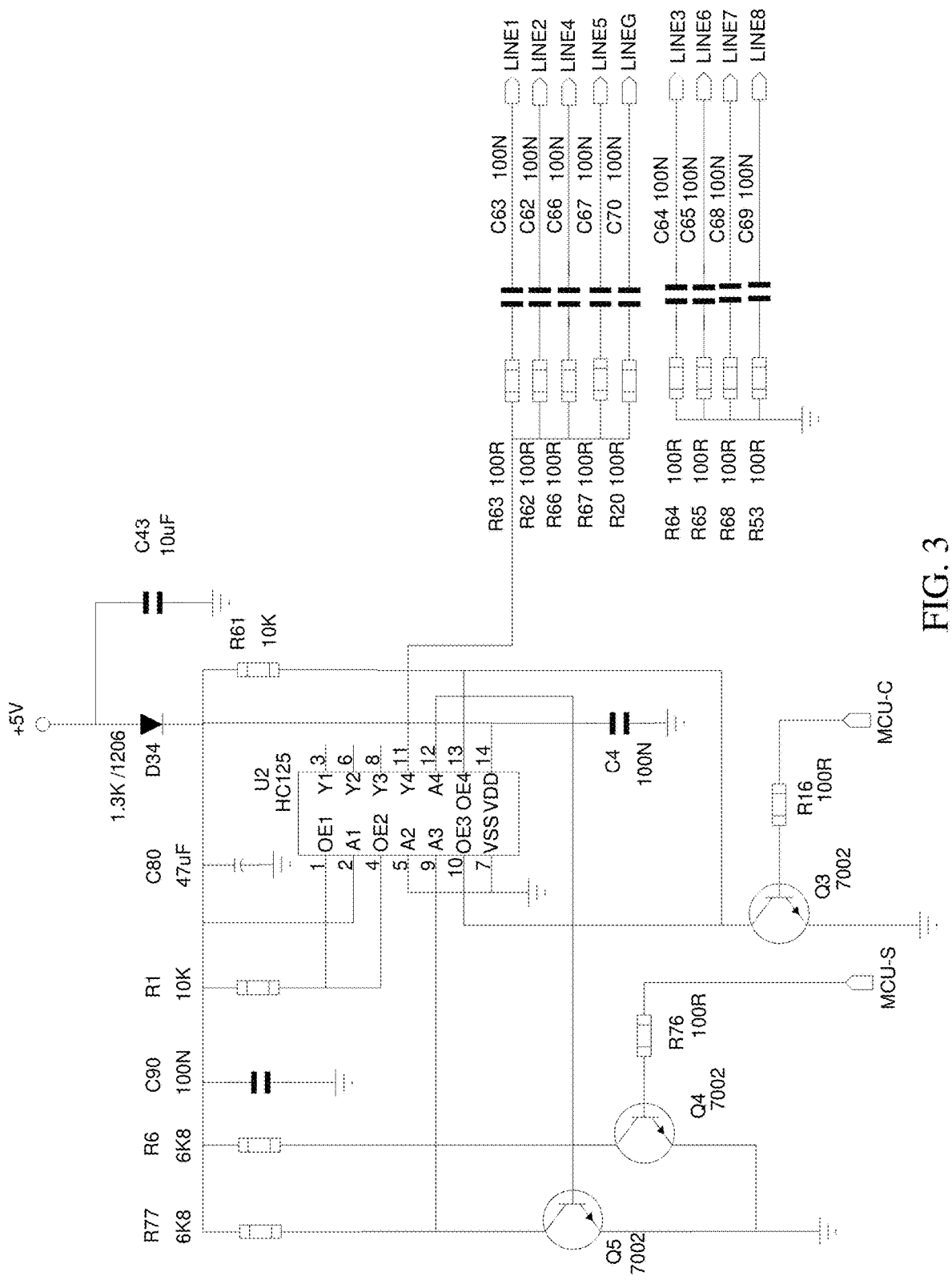
FIG. 3 is a circuit schematic diagram of the line-finding module part in the primary unit of the present disclosure.
Figure 4:
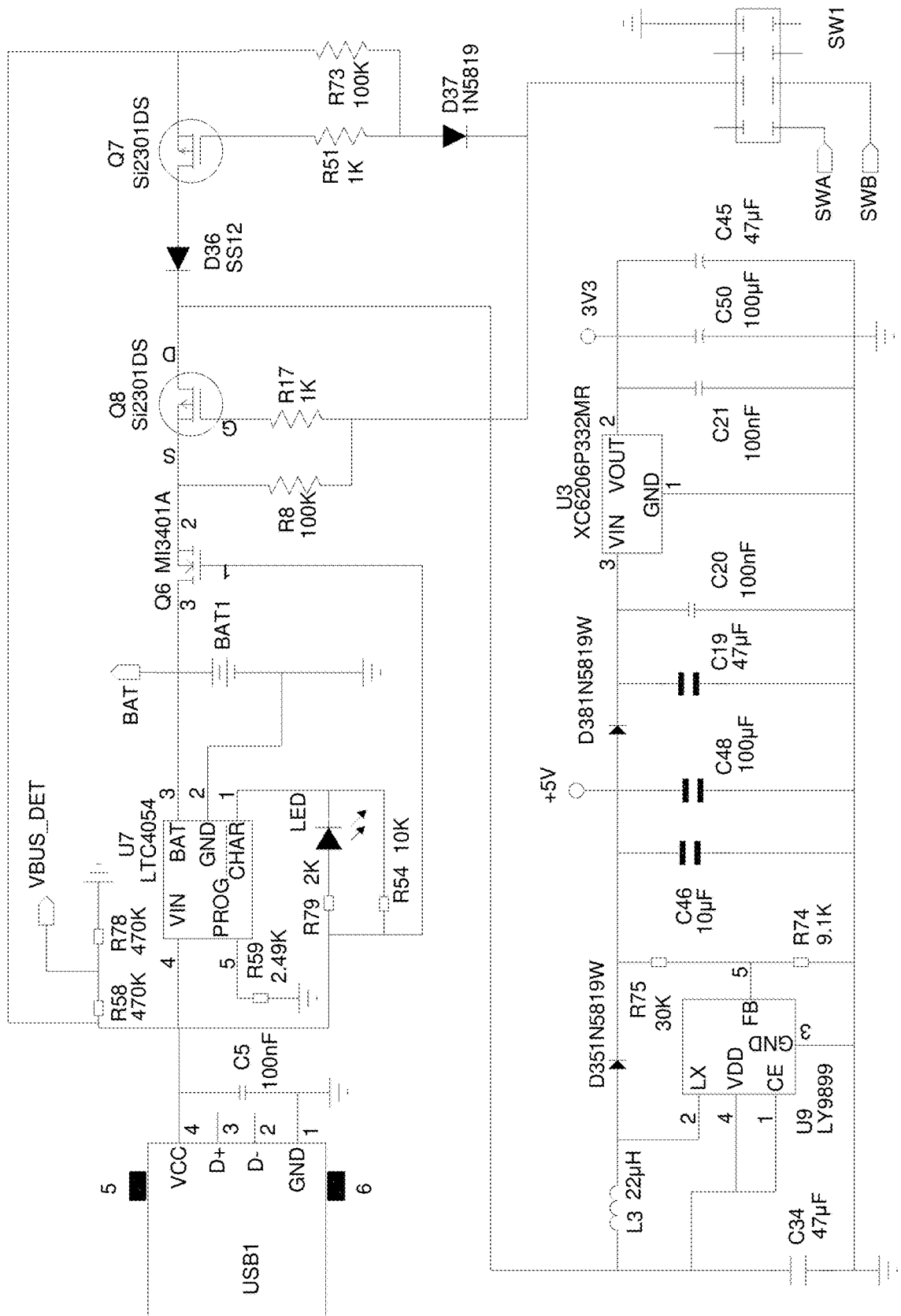
FIG. 4 is a circuit schematic diagram of the power supply module part in the primary unit of the present disclosure.
Figure 5:
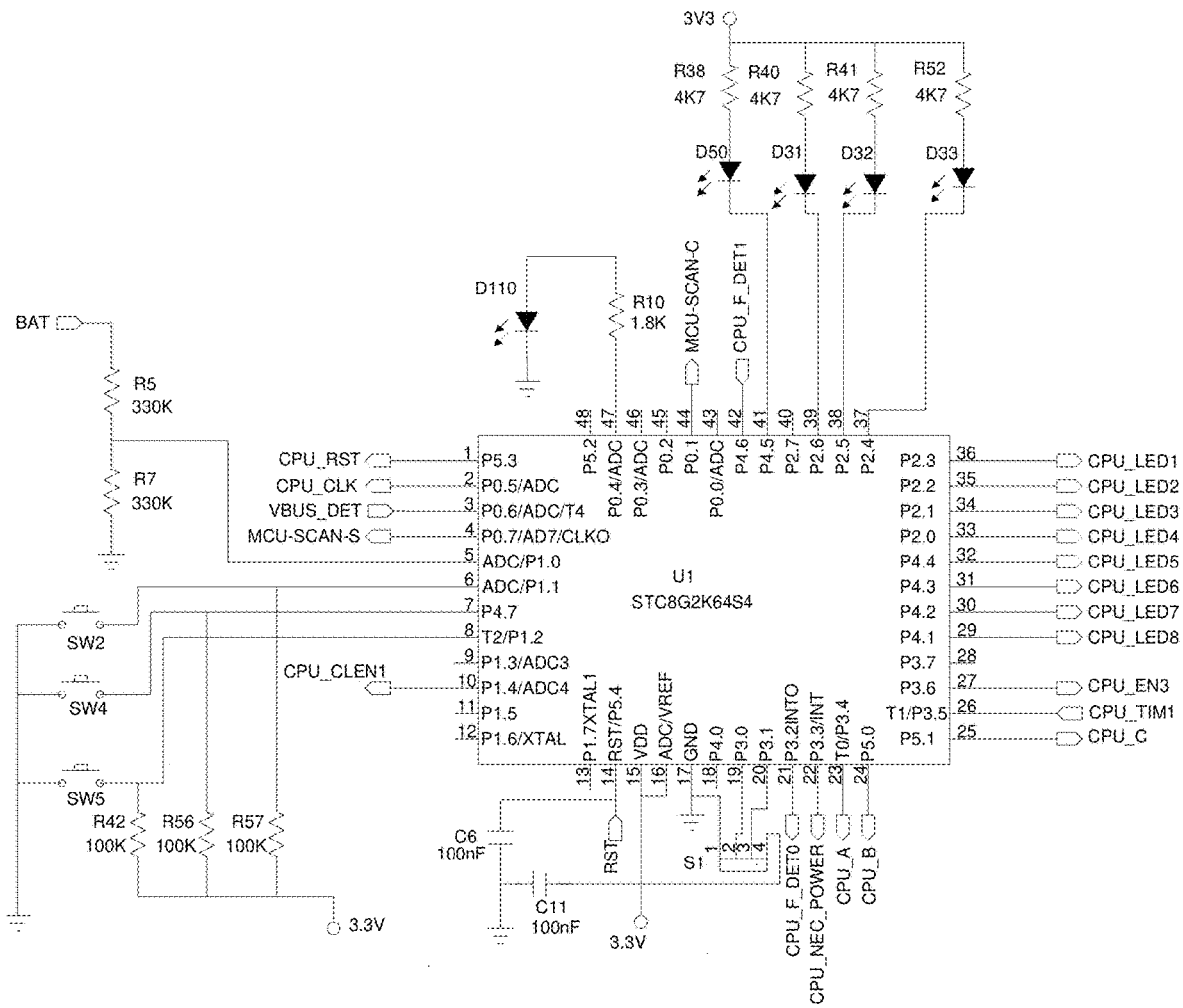
FIG. 5 is a circuit schematic diagram of the primary unit central control module part in the primary unit of the present disclosure.
Figure 6:
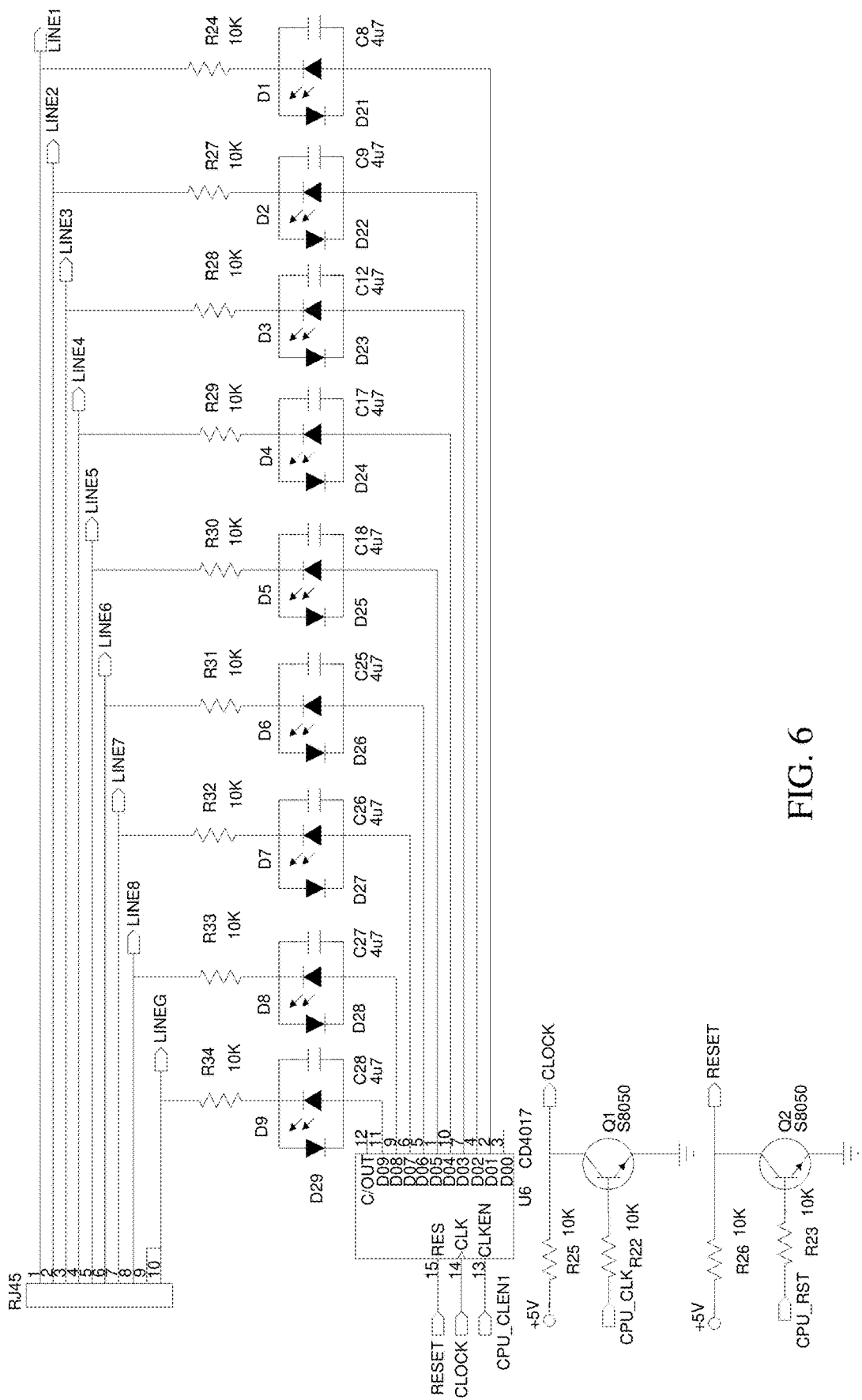
FIG. 6 is a circuit schematic diagram of the line-alignment indicator module part in the primary unit of the present disclosure.
Figure 7:
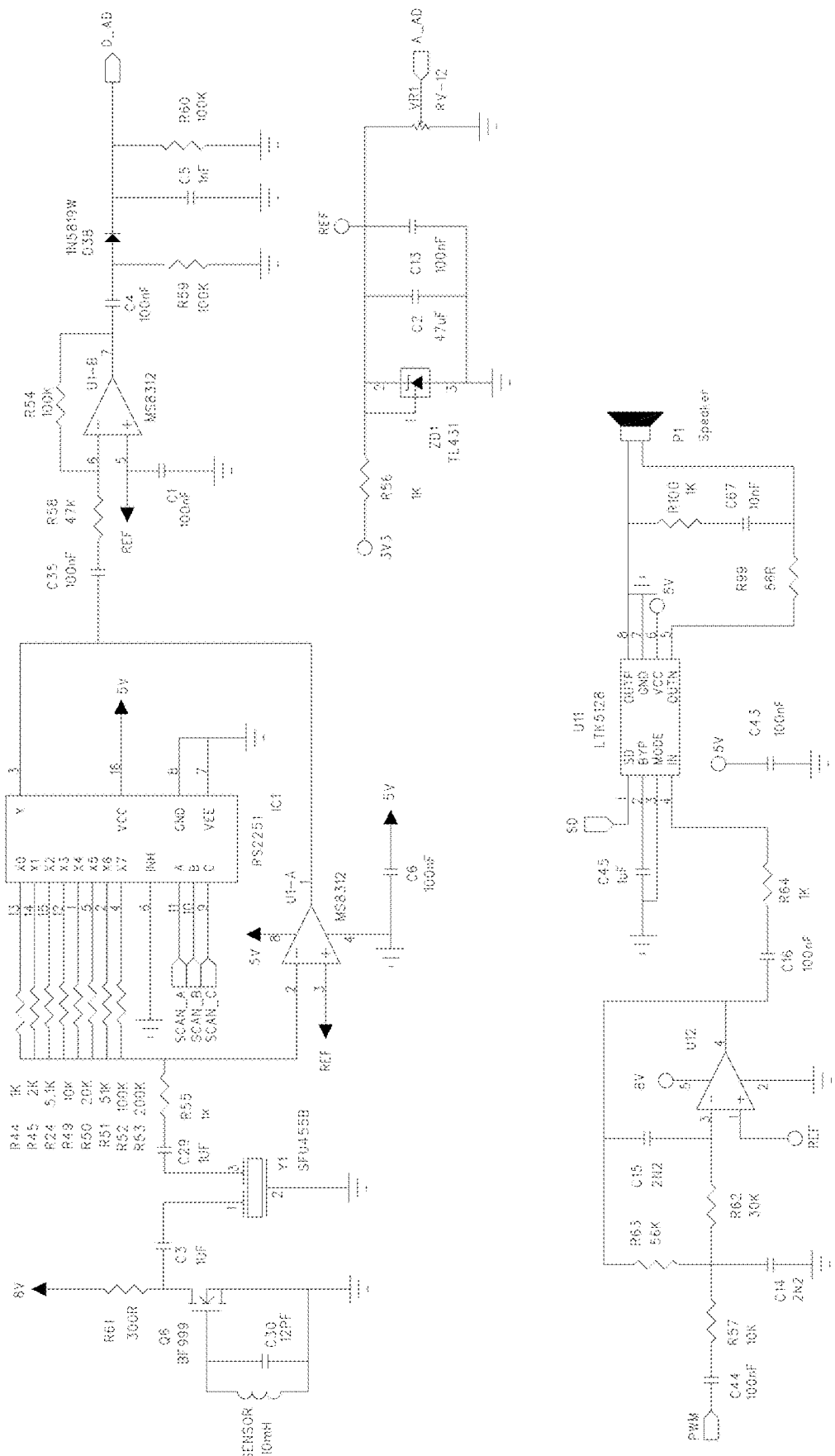
FIG. 7 is a circuit schematic diagram of the line-finding signal amplifying-output module part in the secondary unit of the present disclosure.
Figure 8:
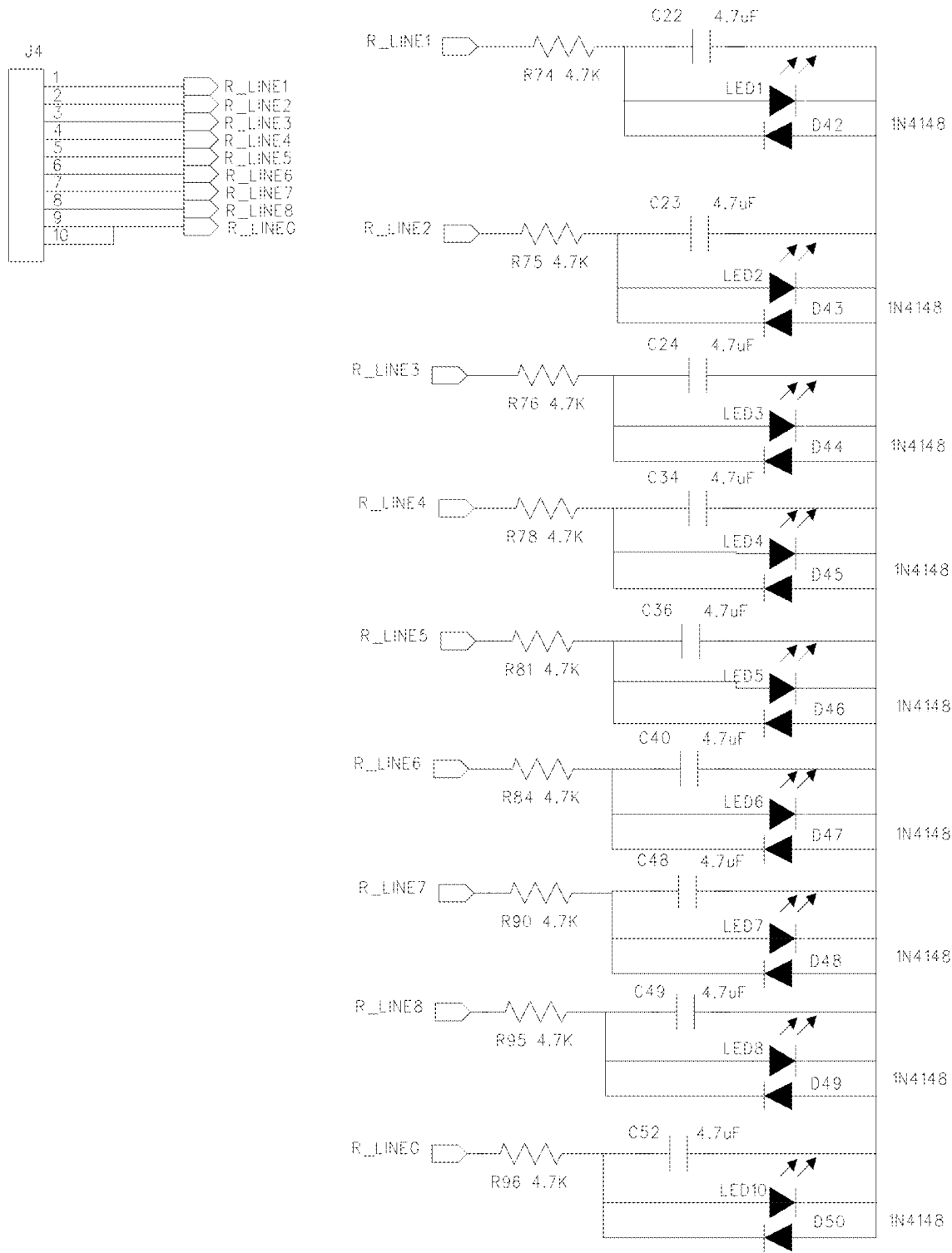
FIG. 8 is a circuit schematic diagram of the remote line-alignment indicator module part in the secondary unit of the present disclosure.
Figure 9:
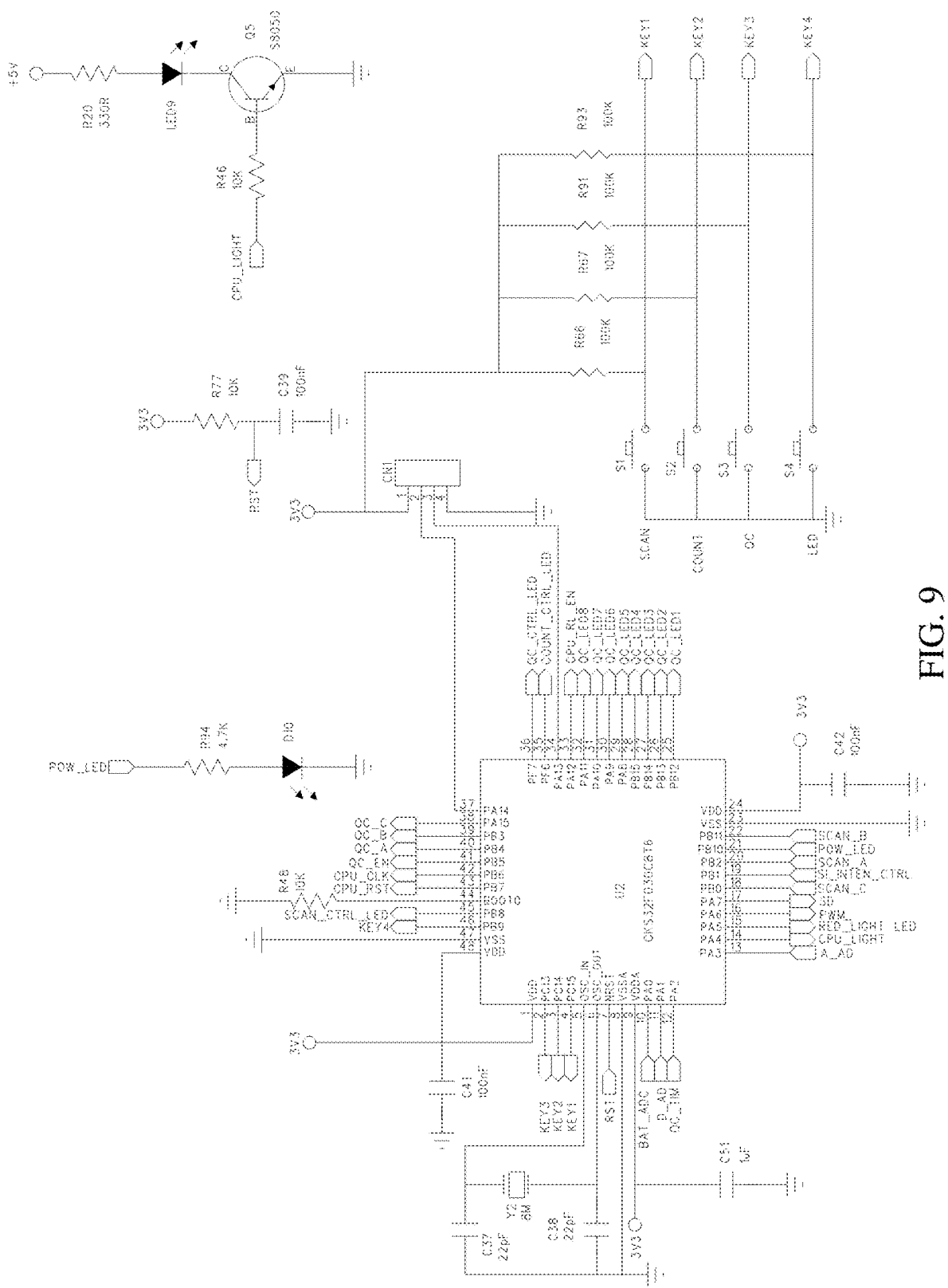
FIG. 9 is a circuit schematic diagram of the secondary unit central control module part in the secondary unit of the present disclosure.

Please focus on the attached FIG. 6, protected in the present disclosure is a line-alignment indicator circuit, including at least one set of LED indicators, each set of LED indicators including one LED lamp, one diode, and one filter capacitor respectively, in which the LED lamp and the diode are connected in reverse parallel, i.e., a positive pole of the LED lamp is connected to a negative pole of the diode, and a negative pole of the LED lamp is connected to a positive pole of the diode, and the filter capacitor is connected in parallel to the LED lamp. In the present embodiment, a capacitance of the filter capacitor is 100 nf-10 µf. In the present embodiment, the LED lamp is connected in series with a current limiting resistor.

In the present embodiment, it is provided with nine sets of LED indicators, which are required to perform line-alignment testing on the RJ-45 interface. For specific implementation, it may also be applied in other testing circuits, such as RS-232 interface, RS-485 interface, and coaxial line interface. The number of LED indicators may also be specifically configured according to the actual requirements. In the aforementioned embodiment, a single LED, a single diode and a single filter capacitor are used for each set of LED indicators. For specific implementation, specific quantities may also be configured according to actual requirements, e.g., two-color LED is used for LED lamps.

Referring in combination to FIGS. 1 to 9, protected in the present disclosure is also a network cabling tool for simultaneous line alignment and line finding by sharing RJ45 connector port, including a primary unit and a secondary unit operating in cooperation with each other. The primary unit mainly includes a primary unit central control module, a line-finding signal amplifying-output module, a line-alignment indicator module, a channel gating module, a power supply module, and a primary unit RJ-45 interface, the line-finding signal amplifying-output module is connected to the primary unit central control module, the primary unit RJ-45 interface is connected to the line-finding signal amplifying-output module, the line-alignment indicator module is connected to the primary unit RJ-45 interface, the channel gating module is connected to the line-alignment indicator module, and the power supply module is used to power the primary unit.

In the present embodiment, the primary unit central control module adopts a microcontroller chip U1 of model STC8G2K64S4. For specific implementation, the primary unit central control module may also adopt other models of microcontroller chips. In the present embodiment, the primary unit central control module is connected with a primary unit indicator. The primary unit indicator includes light-emitting diode D110, light-emitting diode D50, light-emitting diode D31, light-emitting diode D32, and light-emitting diode D33 all connected to a common I/O port of the microcontroller chip U1 respectively. The light-emitting diode is driven directly by the microcontroller chip U1, and the working status of the present disclosure is indicated by the light-emitting diodes.

In the present embodiment, the primary unit central control module is connected with a button module. The button module includes a button SW2, a button SW4, and a button SW5 all connected to a common I/O port of the microcontroller chip U1 respectively. The button module allows input of control information, function selection information, and the like to the primary unit central control module.

In the present embodiment, the primary unit central control module is connected with a battery voltage sampling module, the battery voltage sampling module including a resistor R5 and a resistor R7 connected in series; an end of the resistor R5 is connected to a positive electrode of a lithium battery, an opposite end of the resistor R5 is connected to an end of the resistor R7, an opposite end of the resistor R7 is grounded, and a common end of the resistor R5 and the resistor R7 is directly connected to an I/O port with ADC function of a microcontroller chip U1. If the selected microcontroller chip U1 does not have ADC function, the common port of the resistor R5 and resistor R7 is connected to the AD converter, which is then connected to the primary unit central control module, and the lithium battery voltage may be detected through the battery voltage sampling module, thereby determining the amount of remaining power.

In the present embodiment, the line-alignment indicator module includes nine sets of LED indicators mentioned above, corresponding to one set of LED indicators connected in each data line in the RJ-45 interface of the primary unit, respectively.

In the present embodiment, each set of LED indicators is connected to the channel gating module respectively. The channel gating module adopts a channel gating chip U6 of model CD4017, each set of LED indicators is connected to one channel of the channel gating chip U6, a CLK port of the channel gating chip U6 is connected to a +5V power supply via a current limiting resistor R25, the CLK port of the channel gating chip U6 is connected with a triode Q1, a collector of the triode Q1 is connected to the CLK port of the channel gating chip U6, an emitter of the triode Q1 is grounded, a base of the triode Q1 is connected to a common I/O port of a microcontroller chip U1 via a current limiting resistor R22, a RES port of the channel gating chip U6 is connected to a +5V power supply via a current limiting resistor R26, the RES port of the channel gating chip U6 is connected with a triode Q2, a collector of the triode Q2 is connected to the RES port of the channel gating chip U6, an emitter of the triode Q2 is grounded, and a base of the triode Q2 is connected to a common I/O port of the microcontroller chip U1 via a current limiting resistor R23.

In the present embodiment, the line-finding signal amplifying-output module adopts a line driver U2 of model HC125, a Y4 port of the line driver U2 is connected to a cable of the primary unit RJ-45 port, an A1 port of the line driver U2 is connected to a +5V power supply, an A2 port of the line driver U2 is grounded, an A3 port of the line driver U2 is connected to the +5V power supply via a resistor R77, the A3 port of the line driver U2 is also connected to a collector of a triode Q5, an emitter of the triode Q5 is grounded, an A4 port of the line driver U2 is connected to a base of the triode Q5, the A4 port of the line driver U2 is also connected to a collector of a triode Q4, an emitter of the triode Q4 is grounded, and a base of the triode Q4 is connected to a common I/O port of a microcontroller chip U1. An OE1 port and an OE2 port of the line driver U2 are connected in parallel and connected to the +5V power supply via a resistor R1, an OE3 port and an OE4 port of the line driver U2 are connected in parallel and connected to the +5V power supply via a resistor R61, the OE3 port and the OE4 port of the line driver U2 are connected to a collector of a triode Q3 respectively, an emitter of the triode Q3 is grounded, a base of the triode Q3 is connected to a common I/O port of the microcontroller chip U1.

In the present embodiment, the power supply module comprises a USB port, a lithium battery charging management chip U7, a lithium battery, a DC-DC boosting chip U9, and a voltage regulator chip U3, the USB port, through which the primary unit is charged, is connected to the lithium battery charging management chip U7, the lithium battery is connected to and charged by the lithium battery charging management chip U7, the DC-DC boosting chip U9 is connected to the lithium battery to boost the output voltage of the lithium battery to +5V for power supply, and the voltage regulator chip U3 is connected to the DC-DC boosting chip U9 to regulate the +5V voltage output from the DC-DC boosting chip U9 to +3.3V for power supply.

The secondary unit in the present disclosure is also known as a receiver, in which the secondary unit includes a secondary unit central control module, a line-finding receiving module, a gain gating module, an operational amplifier module, a sensitivity adjusting module, a remote line-alignment module, and a secondary unit RJ-45 interface, the line-finding receiving module is connected to the gain gating module, an output end of the gain gating module is connected to an input end of the operational amplifier module, an output end of the operational amplifier module is connected to a data end of the secondary unit central control module, the detected information that is amplified and outputted by the operational amplifier module is transmitted to the secondary unit central control module, the sensitivity adjusting module is connected to the operational amplifier module, an input end of the sensitivity adjusting module is connected to the data end of the secondary unit central control module, the secondary unit central control module outputs the sensitivity adjusting information to the sensitivity adjusting module, and the remote line-alignment module is connected to the secondary unit RJ-45 interface.

In the present embodiment, the remote line-alignment module includes at least one set of remote line-alignment LED indicators, each set of remote line-alignment LED indicators including one LED lamp, one diode, and one filter capacitor respectively, wherein the LED lamp and the diode are connected in reverse parallel, i.e., a positive pole of the LED lamp is connected to a negative pole of the diode, and a negative pole of the LED lamp is connected to a positive pole of the diode, and the filter capacitor is connected in parallel to the LED lamp. In the present embodiment, a capacitance of the filter capacitor is 100 nf-10 μf. In the present embodiment, the LED lamp is connected in series with a current limiting resistor.

In the present embodiment, it is provided with nine sets of remote line-alignment LED indicators, which are required to perform line-alignment testing on the RJ-45 interface. For specific implementation, it may also be applied in other testing circuits, such as RS-232 interface, RS-485 interface, and coaxial line interface. The number of remote line-alignment LED indicators may also be specifically configured according to the actual requirements. In the aforementioned embodiment, a single LED, a single diode and a single filter capacitor are used for each set of remote line-alignment LED indicators. For specific implementation, specific quantities may also be configured according to actual requirements, e.g., two-color LED is used for LED lamps.

In the present embodiment, the line-finding receiving module adopts a coil sensor, the coil sensor is connected between a gate and a source between an MOS tube Q6, the source of the MOS tube Q6 is grounded, and a drain of the MOS tube Q6 is connected to a +8V power supply. In the present embodiment, a capacitor C30 is connected to the coil sensor in parallel.

In the present embodiment, the drain of the MOS tube Q6 is connected to an end of a ceramic filter Y1, and an opposite end of the ceramic filter Y1 is connected to the gain gating module. In the present embodiment, the gain gating module adopts a channel selector IC1 of model RS2251, each input channel of the channel selector IC1 is connected with a gain resistor respectively, a resistance of each gain resistor is different from each other, the ceramic filter Y1 is connected to the input channels of the channel selector IC1 via each resistor, a signal selecting port of the channel selector IC1 is connected to a data end of the secondary unit central control module, the ceramic filter Y1 is connected to a reverse input end of an amplifier U1-A, an output end of the channel selector IC1 is connected to an output end of the amplifier U1-A, the amplification of the amplifier U1-A is controlled by accessing gain resistors of different resistance, and a forward input end of the amplifier U1-A is connected with the sensitivity adjusting module.

In the present embodiment, the sensitivity adjusting module adopts a controllable precision voltage regulator chip ZD1 of model TL431, and a reference voltage is supplied to the forward input end of the amplifier U1-A via the controllable precision voltage regulator chip ZD1.

In the present embodiment, the operational amplifier module adopts an amplifier U1-B of model MS8312, an output end of the gain gating module is connected to a reverse input end of the amplifier U1-B, a forward input end of the amplifier U1-B is connected with the sensitivity adjusting module, and an output end of the amplifier U1-B is connected to a data end of the secondary unit central control module.

In the present embodiment, the secondary unit further comprises an audio amplifying-output module, the audio amplifying-output module adopts an audio amplifier U11 of model LTK5128, an input end of the audio amplifying-output module is connected to the data end of the secondary unit central control module, and an output end of the audio amplifying-output module is connected with a speaker P1. When an abnormal condition is detected, an alarm is sounded through the speaker P1.

The present disclosure is designed to integrate more functions into the measuring instrument by sharing one port of RJ45 and by simultaneously operating the two functions of wire finding and wire alignment simultaneously. It saves space for product design and time for user measurements. It brings a simpler, faster measurement experience to network installation and maintenance staff. The essence of the inventive work of the present disclosure lies in how to achieve the common use of one RJ45 connection port for line-finding and line-alignment testing, to achieve the two functions of line alignment and line finding simultaneously, and to eliminate the interference and influence of the line-finding signal on the line-alignment testing.

When using the tool in the present disclosure, the line-alignment function is achieved by the line-alignment circuit of the primary unit in cooperation with the remote circuit of the receiver. Microcontroller U1 output clock signal CLK, which controls the channel gating module CD4017. Ten decoders output pulse square wave in sequence (D09-D01), and the output pulse square wave frequency may be adjusted by the microcontroller U1, so that the cycle is able to light up the line-alignment lamp (D1-D9) in an orderly manner. The reset signal RST outputted by the microcontroller U1 ensures that the first lamp (D1) of RJ-45 is lit up every time when it is switched to the line-alignment mode.

When implementing the line-finding function, it is achieved by the line-finding transmitter circuit of the primary unit in cooperation with the receiver circuit of the receiver. The line-finding circuit of the primary unit outputs an intermediate-frequency (300 Hz to 3 Mhz) modulating signal by MCU-SCAN-S, which is amplified by HC125 and outputs a line-finding signal, and MCU-SCAN-C is the output control of the line-finding signal.

As the result of the line-alignment sequence test is indicated by the LED running lamp, when the line-finding function and the line-alignment function are achieved simultaneously, the LED indication of the result of the line-alignment sequence test will be affected by the line-finding signal, resulting in chaotic blinking of the line-alignment LED indicator, which seriously affects the indication of the line-alignment result. To eliminate the interference of the line-finding signal on the line indicator, each line-alignment indicator is connected in parallel with a capacitor with a capacitance of 100 nf-10 µf. Due to the characteristic of the capacitor blocking DC but passing AC, it filters out the influence of IF line-finding signal and does not form voltage difference on the line indicator causing disorderly flashing of the line indicator, so as to achieve the compatibility of the two functions of line finding and line alignment.

The invention claimed is:

1. A network cabling line-alignment indicator circuit, comprising at least one set of LED indicators, each set of LED indicators comprising an LED lamp, a diode, and a filter capacitor respectively, wherein a positive pole of the LED lamp is connected to a negative pole of the diode, and a negative pole of the LED lamp is connected to a positive pole of the diode, the filter capacitor is connected in parallel to the LED lamp, a capacitance of the filter capacitor is 100 nf-10 µf, and the filter capacitor is configured to filter out intermediate-frequency (IF) line-finding signals, so as to achieve compatibility of line finding and line alignment.

2. The network cabling line-alignment indicator circuit according to claim 1, wherein the LED lamp is connected in series with a current limiting resistor.

3. The network cabling line-alignment indicator circuit according to claim 1, wherein the circuit is provided with nine sets of LED indicators, and each set of LED indicators comprises one LED lamp, one diode, and one filter capacitor.

4. A network cabling tool for simultaneous line alignment and line finding by sharing RJ45 connector port, comprising a primary unit and a secondary unit operating in cooperation with each other,
wherein the primary unit comprises a primary unit central control module, a line-finding signal amplifying-output module, a line-alignment indicator module, a channel gating module, a power supply module, and a primary unit RJ-45 interface, the line-finding signal amplifying-output module is connected to the primary unit central control module, the primary unit RJ-45 interface is connected to the line-finding signal amplifying-output module, the line-alignment indicator module is connected to the primary unit RJ-45 interface, the channel gating module is connected to the line-alignment indicator module, and the power supply module is used to power the primary unit;
wherein the line-alignment indicator module comprises at least one set of LED indicators, each set of LED indicators comprising an LED lamp, a diode, and a filter capacitor respectively, a positive pole of the LED lamp is connected to a negative pole of the diode, a negative pole of the LED lamp is connected to a positive pole of the diode, the filter capacitor is connected in parallel to the LED lamp, and a capacitance of the filter capacitor is 100 nf-10 µf;
wherein the secondary unit comprises a secondary unit central control module, a line-finding receiving module, a gain gating module, an operational amplifier module, a sensitivity adjusting module, a remote line-alignment module, and a secondary unit RJ-45 interface, the line-finding receiving module is connected to the gain gating module, an output end of the gain gating module is connected to an input end of the operational amplifier module, an output end of the operational amplifier module is connected to a data end of the secondary unit central control module, the sensitivity adjusting module is connected to the operational amplifier module, an input end of the sensitivity adjusting module is connected to the data end of the secondary unit central control module, and the remote line-alignment module is connected to the secondary unit RJ-45 interface.

5. The network cabling tool for simultaneous line alignment and line finding by sharing RJ45 connector port according to claim 4, wherein the LED lamp is connected in series with a current limiting resistor.

6. The network cabling tool for simultaneous line alignment and line finding by sharing RJ45 connector port according to claim 4, wherein the circuit is provided with nine sets of LED indicators, and each set of LED indicators comprises one LED lamp, one diode, and one filter capacitor.

7. The network cabling tool for simultaneous line alignment and line finding by sharing RJ45 connector port according to claim 4, wherein the primary unit central control module is connected with a primary unit indicator lamp, a button module, and a battery voltage sampling module, the battery voltage sampling module comprising a resistor R5 and a resistor R7 connected in series; an end of the resistor R5 is connected to a positive electrode of a lithium battery, an opposite end of the resistor R5 is connected to an end of the resistor R7, an opposite end of the resistor R7 is grounded, and a common end of the resistor R5 and the resistor R7 is directly connected to an I/O port with ADC function of a microcontroller chip U1.

8. The network cabling tool for simultaneous line alignment and line finding by sharing RJ45 connector port according to claim 5, wherein the primary unit central control module is connected with a primary unit indicator lamp, a button module, and a battery voltage sampling module, the battery voltage sampling module comprising a resistor R5 and a resistor R7 connected in series; an end of the resistor R5 is connected to a positive electrode of a lithium battery, an opposite end of the resistor R5 is connected to an end of the resistor R7, an opposite end of the resistor R7 is grounded, and a common end of the resistor R5 and the resistor R7 is directly connected to an I/O port with ADC function of a microcontroller chip U1.

9. The network cabling tool for simultaneous line alignment and line finding by sharing RJ45 connector port according to claim 6, wherein the primary unit central control module is connected with a primary unit indicator lamp, a button module, and a battery voltage sampling module, the battery voltage sampling module comprising a resistor R5 and a resistor R7 connected in series; an end of the resistor R5 is connected to a positive electrode of a lithium battery, an opposite end of the resistor R5 is connected to an end of the resistor R7, an opposite end of the resistor R7 is grounded, and a common end of the resistor R5 and the resistor R7 is directly connected to an I/O port with ADC function of a microcontroller chip U1.

10. The network cabling tool for simultaneous line alignment and line finding by sharing RJ45 connector port according to claim 4, wherein the channel gating module adopts a channel gating chip U6, each set of LED indicators is connected to one channel of the channel gating chip U6, a CLK port of the channel gating chip U6 is connected to a +5V power supply via a current limiting resistor R25, the CLK port of the channel gating chip U6 is connected with a triode Q1, a collector of the triode Q1 is connected to the CLK port of the channel gating chip U6, an emitter of the triode Q1 is grounded, a base of the triode Q1 is connected to a common I/O port of a microcontroller chip U1 via a current limiting resistor R22, a RES port of the channel gating chip U6 is connected to a +5V power supply via a current limiting resistor R26, the RES port of the channel gating chip U6 is connected with a triode Q2, a collector of the triode Q2 is connected to the RES port of the channel gating chip U6, an emitter of the triode Q2 is grounded, and a base of the triode Q2 is connected to a common I/O port of the microcontroller chip U1 via a current limiting resistor R23.

11. The network cabling tool for simultaneous line alignment and line finding by sharing RJ45 connector port according to claim 5, wherein the channel gating module adopts a channel gating chip U6, each set of LED indicators is connected to one channel of the channel gating chip U6, a CLK port of the channel gating chip U6 is connected to a +5V power supply via a current limiting resistor R25, the CLK port of the channel gating chip U6 is connected with a triode Q1, a collector of the triode Q1 is connected to the CLK port of the channel gating chip U6, an emitter of the triode Q1 is grounded, a base of the triode Q1 is connected to a common I/O port of a microcontroller chip U1 via a current limiting resistor R22, a RES port of the channel gating chip U6 is connected to a +5V power supply via a current limiting resistor R26, the RES port of the channel gating chip U6 is connected with a triode Q2, a collector of the triode Q2 is connected to the RES port of the channel gating chip U6, an emitter of the triode Q2 is grounded, and a base of the triode Q2 is connected to a common I/O port of the microcontroller chip U1 via a current limiting resistor R23.

12. The network cabling tool for simultaneous line alignment and line finding by sharing RJ45 connector port according to claim 6, wherein the channel gating module adopts a channel gating chip U6, each set of LED indicators is connected to one channel of the channel gating chip U6, a CLK port of the channel gating chip U6 is connected to a +5V power supply via a current limiting resistor R25, the CLK port of the channel gating chip U6 is connected with a triode Q1, a collector of the triode Q1 is connected to the CLK port of the channel gating chip U6, an emitter of the triode Q1 is grounded, a base of the triode Q1 is connected to a common I/O port of a microcontroller chip U1 via a current limiting resistor R22, a RES port of the channel gating chip U6 is connected to a +5V power supply via a current limiting resistor R26, the RES port of the channel gating chip U6 is connected with a triode Q2, a collector of the triode Q2 is connected to the RES port of the channel gating chip U6, an emitter of the triode Q2 is grounded, and a base of the triode Q2 is connected to a common I/O port of the microcontroller chip U1 via a current limiting resistor R23.

13. The network cabling tool for simultaneous line alignment and line finding by sharing RJ45 connector port according to claim 4, wherein:
the line-finding signal amplifying-output module adopts a line driver U2, a Y4 port of the line driver U2 is connected to a cable of the primary unit RJ-45 port, an A1 port of the line driver U2 is connected to a +5V power supply, an A2 port of the line driver U2 is grounded, an A3 port of the line driver U2 is connected to the +5V power supply via a resistor R77, the A3 port of the line driver U2 is also connected to a collector of a triode Q5, an emitter of the triode Q5 is grounded, an A4 port of the line driver U2 is connected to a base of the triode Q5, the A4 port of the line driver U2 is also connected to a collector of a triode Q4, an emitter of the triode Q4 is grounded, and a base of the triode Q4 is connected to a common I/O port of a microcontroller chip U1;
an OE1 port and an OE2 port of the line driver U2 are connected in parallel and connected to the +5V power supply via a resistor R1, an OE3 port and an OE4 port of the line driver U2 are connected in parallel and connected to the +5V power supply via a resistor R61, the OE3 port and the OE4 port of the line driver U2 are connected to a collector of a triode Q3 respectively, an emitter of the triode Q3 is grounded, a base of the triode Q3 is connected to a common I/O port of the microcontroller chip U1.

14. The network cabling tool for simultaneous line alignment and line finding by sharing RJ45 connector port according to claim 5, wherein:
the line-finding signal amplifying-output module adopts a line driver U2, a Y4 port of the line driver U2 is connected to a cable of the primary unit RJ-45 port, an A1 port of the line driver U2 is connected to a +5V power supply, an A2 port of the line driver U2 is grounded, an A3 port of the line driver U2 is connected to the +5V power supply via a resistor R77, the A3 port of the line driver U2 is also connected to a collector of a triode Q5, an emitter of the triode Q5 is grounded, an A4 port of the line driver U2 is connected to a base of the triode Q5, the A4 port of the line driver U2 is also connected to a collector of a triode Q4, an emitter of the triode Q4 is grounded, and a base of the triode Q4 is connected to a common I/O port of a microcontroller chip U1;
an OE1 port and an OE2 port of the line driver U2 are connected in parallel and connected to the +5V power supply via a resistor R1, an OE3 port and an OE4 port of the line driver U2 are connected in parallel and connected to the +5V power supply via a resistor R61, the OE3 port and the OE4 port of the line driver U2 are connected to a collector of a triode Q3 respectively, an emitter of the triode Q3 is grounded, a base of the triode Q3 is connected to a common I/O port of the microcontroller chip U1.

15. The network cabling tool for simultaneous line alignment and line finding by sharing RJ45 connector port according to claim 6, wherein:
the line-finding signal amplifying-output module adopts a line driver U2, a Y4 port of the line driver U2 is connected to a cable of the primary unit RJ-45 port, an A1 port of the line driver U2 is connected to a +5V power supply, an A2 port of the line driver U2 is grounded, an A3 port of the line driver U2 is connected to the +5V power supply via a resistor R77, the A3 port of the line driver U2 is also connected to a collector of a triode Q5, an emitter of the triode Q5 is grounded, an A4 port of the line driver U2 is connected to a base of the triode Q5, the A4 port of the line driver U2 is also connected to a collector of a triode Q4, an emitter of the triode Q4 is grounded, and a base of the triode Q4 is connected to a common I/O port of a microcontroller chip U1;
an OE1 port and an OE2 port of the line driver U2 are connected in parallel and connected to the +5V power supply via a resistor R1, an OE3 port and an OE4 port of the line driver U2 are connected in parallel and connected to the +5V power supply via a resistor R61, the OE3 port and the OE4 port of the line driver U2 are connected to a collector of a triode Q3 respectively, an emitter of the triode Q3 is grounded, a base of the triode Q3 is connected to a common I/O port of the microcontroller chip U1.

16. The network cabling tool for simultaneous line alignment and line finding by sharing RJ45 connector port according to claim 4, wherein the power supply module comprises a USB port, a lithium battery charging management chip U7, a lithium battery, a DC-DC boosting chip U9, and a voltage regulator chip U3, the USB port is connected to the lithium battery charging management chip U7, the lithium battery is connected to the lithium battery charging management chip U7, the DC-DC boosting chip U9 is connected to the lithium battery, and the voltage regulator chip U3 is connected to the DC-DC boosting chip U9.

17. The network cabling tool for simultaneous line alignment and line finding by sharing RJ45 connector port according to claim 5, wherein the power supply module comprises a USB port, a lithium battery charging management chip U7, a lithium battery, a DC-DC boosting chip U9, and a voltage regulator chip U3, the USB port is connected to the lithium battery charging management chip U7, the lithium battery is connected to the lithium battery charging management chip U7, the DC-DC boosting chip U9 is connected to the lithium battery, and the voltage regulator chip U3 is connected to the DC-DC boosting chip U9.

18. The network cabling tool for simultaneous line alignment and line finding by sharing RJ45 connector port according to claim 6, wherein the power supply module comprises a USB port, a lithium battery charging management chip U7, a lithium battery, a DC-DC boosting chip U9, and a voltage regulator chip U3, the USB port is connected to the lithium battery charging management chip U7, the lithium battery is connected to the lithium battery charging management chip U7, the DC-DC boosting chip U9 is connected to the lithium battery, and the voltage regulator chip U3 is connected to the DC-DC boosting chip U9.

19. The network cabling tool for simultaneous line alignment and line finding by sharing RJ45 connector port according to claim 4, wherein the remote line-alignment module comprises at least one set of remote line-alignment LED indicators, each set of remote line-alignment LED indicators comprising an LED lamp, a diode, and a filter capacitor respectively, wherein a positive pole of the LED lamp is connected to a negative pole of the diode, and a negative pole of the LED lamp is connected to a positive pole of the diode, the filter capacitor is connected in parallel to the LED lamp, and a capacitance of the filter capacitor is 100 nf-10 μf.

20. The network cabling tool for simultaneous line alignment and line finding by sharing RJ45 connector port according to claim 4, wherein:

the line-finding receiving module adopts a coil sensor, the coil sensor is connected between a gate and a source of an MOS tube Q6, the source of the MOS tube Q6 is grounded, a drain of the MOS tube Q6 is connected to a +8V power supply, the drain of the MOS tube Q6 is connected to an end of a ceramic filter Y1, and an opposite end of the ceramic filter Y1 is connected to the gain gating module;

the gain gating module adopts a channel selector IC1, each input channel of the channel selector IC1 is connected with a gain resistor respectively, a resistance of each gain resistor is different from each other, the ceramic filter Y1 is connected to the input channels of the channel selector IC1 via each resistor, a signal selecting port of the channel selector IC1 is connected to a data end of the secondary unit central control module, the ceramic filter Y1 is connected to a reverse input end of an amplifier U1-A, an output end of the channel selector IC1 is connected to an output end of the amplifier U1-A, and a forward input end of the amplifier U1-A is connected with the sensitivity adjusting module;

the sensitivity adjusting module adopts a controllable precision voltage regulator chip ZD1, the operational amplifier module adopts an amplifier U1-B, an output end of the gain gating module is connected to a reverse input end of the amplifier U1-B, a forward input end of the amplifier U1-B is connected to the sensitivity adjusting module, and an output end of the amplifier U1-B is connected to a data end of the secondary unit central control module; and the secondary unit further comprises an audio amplifying-output module, the audio amplifying-output module adopts an audio amplifier U11, an input end of the audio amplifying-output module is connected to the data end of the secondary unit central control module, and an output end of the audio amplifying-output module is connected with a speaker P1.

\* \* \* \* \*